United States Patent [19]

Hackett et al.

[11] Patent Number: 5,140,648
[45] Date of Patent: Aug. 18, 1992

[54] SCALER GATE ARRAY FOR SCALING IMAGE DATA

[75] Inventors: James I. Hackett, Victor; David W. Dellert; Mark R. Knudson, both of Rochester, all of N.Y.

[73] Assignee: Eastman Kodak Company, Rochester, N.Y.

[21] Appl. No.: 619,538

[22] Filed: Dec. 29, 1990

Related U.S. Application Data

[62] Division of Ser. No. 458,059, Dec. 28, 1989, Pat. No. 5,068,905.

[51] Int. Cl.⁵ .......................... G06K 9/42; G06K 9/32
[52] U.S. Cl. ................................ 382/47; 382/44; 358/451
[58] Field of Search ..................... 382/47, 44, 54; 340/731; 358/451

[56] References Cited

U.S. PATENT DOCUMENTS

| | | | |
|---|---|---|---|
| 4,598,283 | 7/1986 | Tung et al. | 382/47 |
| 4,809,345 | 2/1989 | Tabata et al. | 382/47 |
| 4,907,171 | 3/1990 | Nagashima | 358/451 |
| 4,907,284 | 3/1990 | Ohuchi | 382/47 |

*Primary Examiner*—Michael Razavi
*Assistant Examiner*—Michael Cammarata
*Attorney, Agent, or Firm*—Mark Z. Dudley

[57] ABSTRACT

The apparatus and method of the present invention utilizes three scaling functions for bi-tonal digitized image data such as documents. The digitized document resolution (i.e. from a digitizing scanner) may be different from the resolution of an image output device (i.e. laser printer, CRT display, fax machine, etc.). The invention takes in the scanned image data and scales the data to compensate for the resolution mismatch of the output device. Although the invention is intended for document archive applications (such as scanning documents on microfilm), the scaling can be performed on any bi-tonal image.

2 Claims, 3 Drawing Sheets

SCALER GATE ARRAY FOR SCALING IMAGE DATA

This application is a division of application Ser. No. 07/458,059 filed 12/28/89 now U.S. Pat. No. 5,068,905.

FIELD OF THE INVENTION

The present invention is related to the field of image processing and, more specifically, to an apparatus and associated methods for the scaling of digital images.

BACKGROUND OF THE INVENTION

Prior art in this area started with the advent of digitizing scanners. Once documents could be scanned into digital data format, scaling could be performed algorithmically in hardware or software. Many algorithms have been devised with respect to this topic, virtually all requiring significant amounts of data processing throughput. Because of high throughput requirements and advances in semiconductor technology, more of these algorithms are being realized in digital hardware implementations.

A patent of interest for its teachings in this art area is U.S. Pat. No. 4,275,450 entitled "Magnification/-Demagnification Apparatus and Method" by J. L. Potter. The patent discloses an apparatus and a method which permits the selective variation in the size of an output image derived from digital image signals. The apparatus performs a reduction by generating a reduction count which count is used to control the gating of a series of image pixels such that the pixel existing at the input to a gate at the time the count is reached is not passed. The reduction count is continually cycled such that the pixels occurring at the input to the gate at the time of the count being reached are inhibited. The process of multiplication, or of increasing the size of the image, is accomplished by passing the pixel on the input of the gate more than once. For example, if the image is to be doubled in size two pixels will be passed for each pixel received The to be scaled image data may be taken directly from a scanner, scaled, and processed results sent to an output device. However, this is not widely done because of mismatches in throughput and dependencies on scale factors. The scanned image data is normally stored in a frame buffer memory and retrieved under direct memory access, programmed input/output, or interrupt driven input/output control. The processed (scaled) image data may then be stored in a system memory. It would be desirable to have a scaling system and method that could also accept data from a compression/expansion processor based upon the CCITT document standard. This allows documents that were previously scanned, compressed and stored on disk to be retrieved, expanded and scaled.

SUMMARY OF THE INVENTION

The present invention is directed to an apparatus and associated methods for performing bitonal digitized image scaling. Moreover, the invention is particularly adaptable to an implementation as a monolithic semiconductor integrated circuit utilizing semi-custom, very large scale integration (VLSI) gate array technology. This invention, when incorporated with various available VLSI devices, can be used to create a commercially viable image processing system.

Two of the disclosed method embodiments are for scaling down (creating an image data reduction) and one is for scaling up (creating an image data magnification). Scaling down of an image is done by either a subsampling of the pixels or by applying a logical operator to a grouping of pixels. Scaling up is done by pixel replication. Scaling up or down can be done at scale factors of 255 to 1, in increments of one hundredth (0.01). Scaling up or down and by what scale factor is user selectable (through interface software) before the scaling begins. The scaling can be done with other user selectable options, such as one or two dimensional image scaling, black-on-white or white-on-black, etc.

From the foregoing it can be seen that it is a primary object of the present invention to provide an improved apparatus and method for scaling digital images.

It is yet a further object of the present invention to provide a digital image scaling system and method with a wide range of scaling increments.

The above and other objects of the present invention will become more apparent when taken in conjunction with the following description and drawings wherein like characters indicate like parts and which drawings form a part of the present disclosure.

DESCRIPTION OF THE PREFERRED EMBODIMENTS

Figure 1:
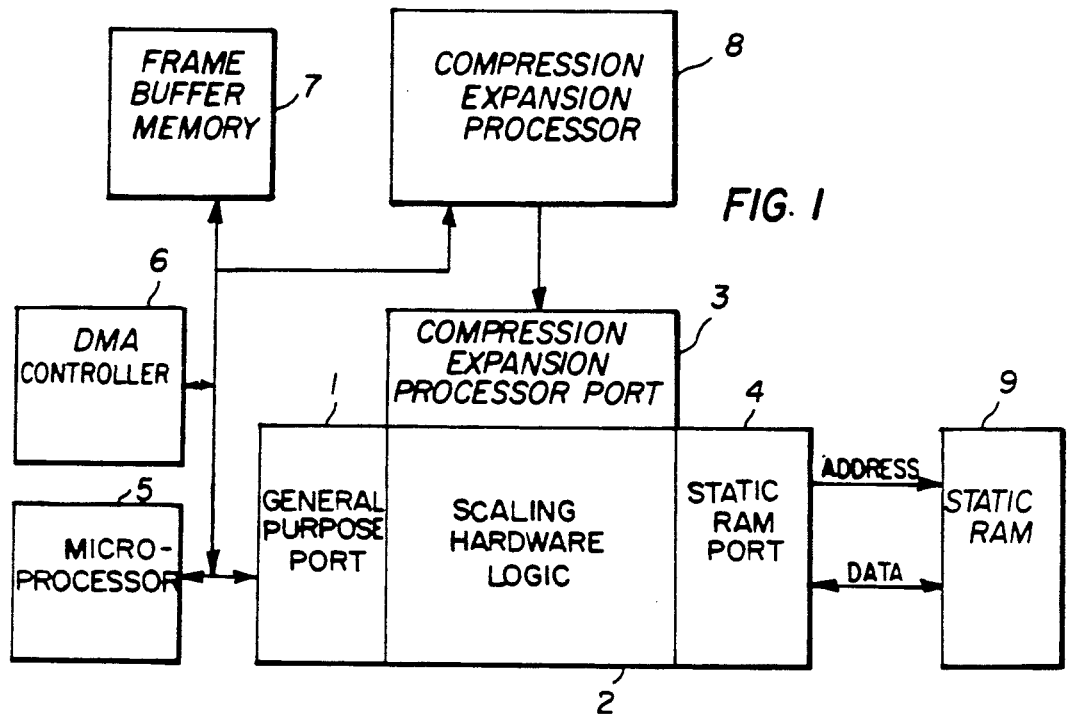
FIG. 1 is a block level diagram illustrating the preferred embodiment of the invention in a system environment.

Referring to FIG. 1, the preferred embodiment is illustrated in block diagram form comprised of a compression expansion processor port 3, a general purpose port 1, a static RAM port 4, and scaling hardware logic 2. The general purpose port 1 exists to provide a means for communicating data to the outside world. The interface hardware logic within this port is compatible with virtually any commercially available microprocessor 5. Initialization and setup data parameters can be loaded under programmed input/out control through this port. Also an input data stream of bi-tonal image pixels can be entered through this port. This raw image data is internally passed to the scaling hardware logic 2, where any of three scaling algorithms can be performed. The scaled image data is passed back by the scaling hardware logic 2 to the general purpose port 1. The scaled data can then be obtained by the microprocessor 5 and used by the system. Input and output data streams can also be passed between the general purpose port 1 and the microprocessor 5 under interrupt driven control. A DMA controller 6 is also provided as a source of bi-directional data transfer between the outside world and the preferred embodiment. Either the microprocessor 5 or the DMA controller 6 can obtain raw unscaled image data from a frame buffer memory 7 and also store scaled and processed image data in the frame buffer memory 7.

The static RAM port 4 is provided to create an interface to virtually any commercially available static RAM 9.

The compression expansion processor port 3 exists to provide another data path for the raw image data to enter the scaling hardware logic 2. This data path would typically be used in conjunction with a compression/expansion processor 8. The compression expansion processor port 3 also provides a means to take advantage of VlSI devices installed within commercially available compression/expansion processors. These VLSI devices can read compressed image document data (i.e. the Consultative Committee for International Telephone and Telegraph or CCITT document standard) into memory, expand it back to original data content and pass it to the scaling hardware logic 2 for scaling via the port 3.

The preferred apparatus utilizes pipelining techniques that require hardware interlocks to freeze the apparatus on occasion. The interlocks cause the scaling to halt and the state of the apparatus to be held. This provides a mechanism for synchronizing the apparatus with external devices, such as, the microprocessor 5 or the DMA controller 6, to enable proper servicing of the input or output data stream. This freezing can occur due to frame buffer memory 7 refresh requirements, frame buffer memory data swapping to or from a disk, etc.

Figure 2:
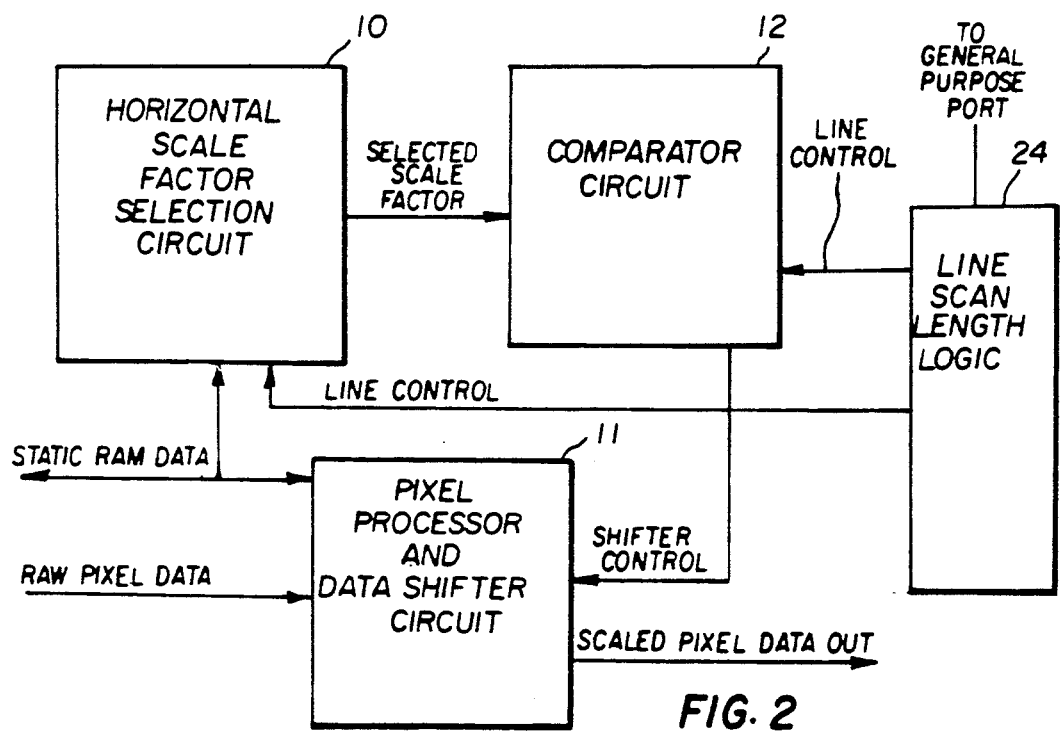
FIG. 2 is a sub level block diagram illustrating the scaling hardware logic.

FIG. 2 illustrates a block level diagram of the scaling hardware logic 2. It is sub-divided into a horizontal scale factor selection circuit 10, a pixel processor and data shifter circuit 11, a comparator circuit 12, and a line scan length logic circuit 24.

Figure 3:
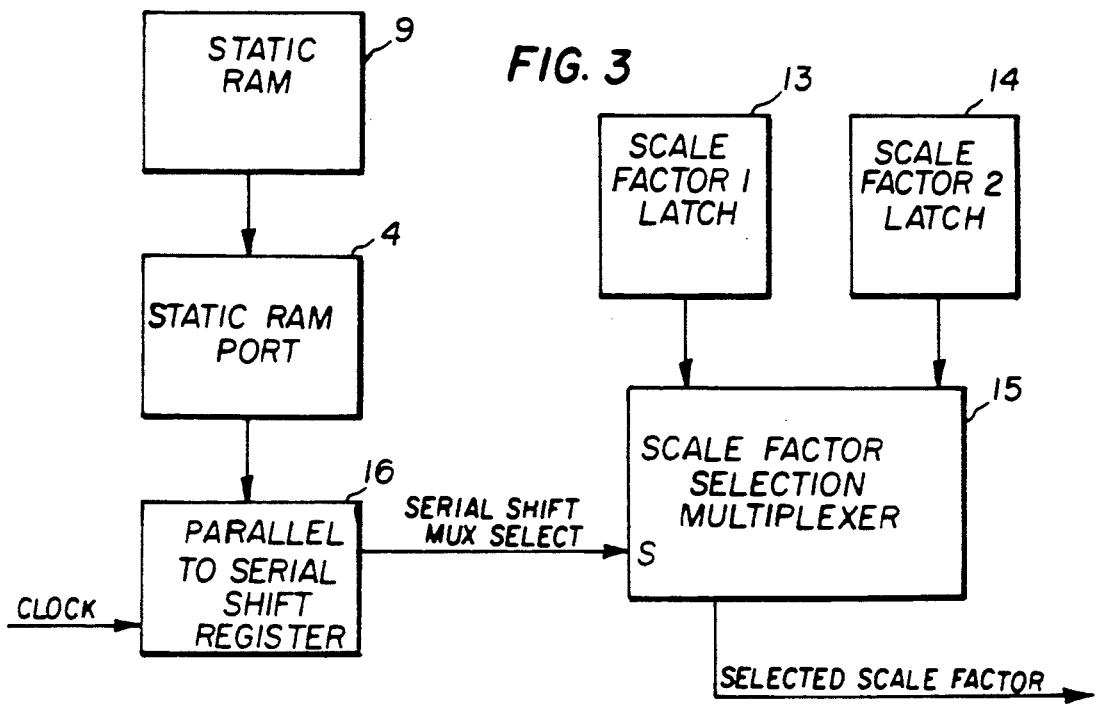
FIG. 3 is a sub level block diagram illustrating the horizontal scale factor selection circuit.

The horizontal scale factor selection circuit 10 is illustrated in more detail in FIG. 3. The circuit is shown comprised of a parallel to serial shift register 16, receiving a CLOCK signal and the output from the static RAM port 4, a scale factor 1 latch 13, a scale factor 2 latch 14, and a scale factor selection multiplexer 15.

In operation the scaling of the image data will occur by an amount equal to either scale factor 1 or to scale factor 2. These scale factors are selectable integer numbers ranging between 1 and 255. The scale factors are loaded into latches 13 and 14 under PIO control by way of the general purpose port 1 before any image scaling begins. The scale factors determine how many pixels to scale by, in the horizontal (x) direction. Scale factor 1 and scale factor 2 are always one integer apart (i.e. 4 and 5 or 127 and 128). Selecting between these two scale factors, in some sequence of 100, will yield a scaling accuracy of one hundredth (0.01). If, for example, a 4.01 scaling were desired, the scale factors would be 4 and 5. Out of a sequence of 100, 4 would be selected 99 times and 5 would be selected once. The scale factor selection multiplexer 15 selects the scale factor to be used for each pixel scaling sequence. The scale factor selection multiplexer 15 select input S is connected to the output of the parallel to serial shift register 16. The parallel to serial shift register 16 is loaded in parallel with a bit stream from the static RAM 9 through the static RAM port 4. The serial shifting, each CLOCK cycle, creates a series of bits to control the scale factor selection multiplexer 15. The process of loading and shifting the bit stream is iterated as the scaling proceeds in the horizontal direction. The parallel to serial shift register 16 is an 8-bit register. Yet, as stated earlier, a scale factor selection sequence of 100 is needed for the desired accuracy. Since 8 does not divide into 100 evenly, 100 of the static RAM 9's memory locations are used to store 100 8-bit stream sequences. This guarantees that an integer number of static RAM accesses can be made to obtain a sequence of 100 scale factors. In actuality, not all 100 locations need be used. If a 4.5 scaling were desired, for example, one 8-bit value could select between a scale factor of 4 and a scale factor of 5. In this case, only one 8-bit static RAM location is needed to achieve the scale factor selection sequence of 100. The generation of this stream, which is between 1 to 100 8-bit values, is done off-line in software before any scaling begins and is pre-loaded into the static RAM 9.

The generation of the control sequence takes two operations. First, the two scale factor integers must be calculated, then the control sequence is generated. The first scale factor integer is calculated by truncating the desired scaled factor to an integer (round down). The second control integer is calculated by adding one to the first scale factor integer.

The control sequence is generated by sequencing either the first or the second scale factor integer and determining the effective scale ratio after each iteration of the sequence.

The following is a pseudo-code listing illustrating the sequence:

| PSEUDO CODE TO GENERATE SEQUENCE | |
| --- | --- |
| Variables: | |
| CTSI | current total of sequence integers |
| SS | size of sequence |
| DSF | desired scale factor |
| SSFI | second scale factor integer |
| FSFI | first scale factor integer |
| CSF | current scale factor |
| Code: | |
| CTSI = FSFI | |
| SS = 1 | |
| Do | |
|     (CTSI)/(SS) = (CSF) | |
|     If (CSF) > (DSF) | |
|         Then | |
|             CTSI = CTSI + FSFI | |
|             SS = SS + 1 | |
|     (CTSI)/(SS) = (CSF) | |
|     If (CSF) < (DSF) | |
|         Then | |
|             CTSI = CTSI + FSFI | |
|             SS = SS + 1 | |
| While ((SS <= (Max size of sequence)) & | |
| (ABSOLUTE VALUE ((CTSI/SS) − DSF) > ERROR)) | |
| Example: | |
| Desired Scale factor | 7.125 |
| First scale factor integer: | 7 |
| Second scale factor integer: | 8 |
| First Number in the sequence 7 | |
| SS = 1 | |
| Sequence entry (0) = 7 | |
| CTSI = 7 | |
| CSF = 7 | |
| SS = 2 | |
| Sequence entry (1) = 8 | |
| CTSI = 15 | |
| CSF = 7.5 | |
| SS = 3 | |
| Sequence entry (2) = 7 | |
| CTSI = 22 | |
| CFS = 7.33 | |
| SS = 4 | |
| Sequence entry (3) = 7 | |
| CTSI = 29 | |
| CFS = 7.25 | |
| SS = 5 | |
| Sequence entry (4) = 7 | |
| CTSI = 36 | |
| CFS = 7.2 | |
| SS = 6 | |
| Sequence entry (5) = 7 | |
| CTSI = 43 | |

-continued

PSEUDO CODE TO GENERATE SEQUENCE

CFS = 7.167
SS = 7
Sequence entry (6) = 7
CTSI = 50
CFS = 7.124
SS = 8
Sequence entry (7) = 7
CTSI = 57
CFS = 7.125
Sequence for a desired scale factor of 7.125:
7,8,7,7,7,7,7

Because the horizontal pixel processing rate is very high, the horizontal sequence is programmed into the static RAM as a sequence of 1's and 0's. By converting the sequence into 1's and 0's the system can retrieve 8 scale factor integers for every static RAM access. The 1's and 0's select between the two scale factors that are loaded into the latches 13 and 14. The vertical sequence is programmed into the static RAM as integers.

For the previous example the horizontal section of the static RAM would be loaded with: 40 (hex).

Figure 4:
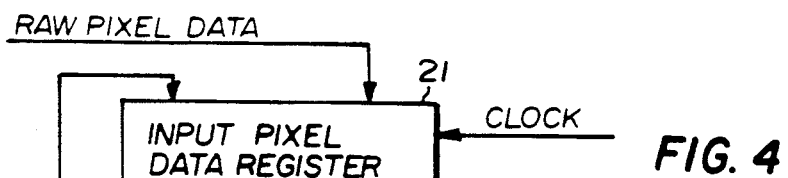
FIG. 4 is a sub level block diagram illustrating the pixel processor and data shifter circuit.

FIG. 4 illustrates a block diagram of the pixel processor and data shifter circuit 11. Here raw input pixel image data enters an input pixel data register 21 under control of the CLOCK signal. The input data register 21 is 8-bits wide. The input data register 21 sends the pixels to a data shifter 20. The data shifter 20 is organized such that the 8 bits from the input data register 21 are re-aligned in a 16-bit field at the data shifter 20's output. The data shifter 20 will shift between 0 and 8 positions, depending on the shifter control value. Out of the 16-bit output field, the 8 least significant bits (LSB's) are fed back to the input data register 21. The 8 most significant bits (MSB's) are applied to a logic operator and subsample circuit 22. Therefore, only 8 pixels at a maximum can be scaled on a given CLOCK cycle. Any pixels that are not used for scaling on a given CLOCK cycle remain in the 8 LSB's of the data shifter 20 and are fed back to the input data register 21 on the following CLOCK edge. The logic operator and subsample circuit 22 are responsible for taking the shifted pixels and performing the scaling with respect to which one of three scaling algorithms is selected. The shifted pixels are grouped in the logic operator and subsample circuit 22 by the amount of the selected scale factor. A scale grouping has a slightly different meaning depending on which method of scaling is being performed. For subsampling, it represents the number of pixels we are throwing away plus the one pixel we are keeping in the scaled group of pixels. For logical reduction, it represents the group of pixels we are applying to the logic operator. For pixel replication, it represents how many times the current input pixel must be replicated. Several iterative CLOCK cycles may be necessary to scale a pixel grouping, depending on the magnitude of the selected scale factor (i.e. scale factors greater than 8). For subsampling, once a pixel grouping is complete, the last pixel shifted into the data shifter 20 represents the subsampled pixel value. This subsampled pixel value will appear at the scaled pixel output of the logic operator and subsample circuit 22. For logical reduction, a logical OR operation on the foreground pixels (alternatively a logical AND of the background pixels) is performed on all pixels in the scale grouping. This circuit can handle binary image polarity inversion so that the user can specify black-on-white or white-on-black documents. The output of the logic operator becomes the scaled pixel output of the logic operator and subsample circuit 22. For pixel replication, the LSB of the input pixel data register 21 is simply passed to the scaled pixel output of the logic operator and subsample circuit 22 for replication. In this case, the shifter control value is held at 0 each CLOCK cycle such that no shifting occurs in the data shifter 20. Once the input pixel is replicated the requisite number of times, the shifter control switches to a one-for-one CLOCK cycle. This causes the next input pixel to become the LSB applied to the input pixel data register 21, where it can then be replicated. Regardless of which scaling algorithm is being used, the scaled pixel output of the logic operator and subsample circuit 22 is passed to the serial to parallel shift register 23. Here the scaled pixel values are assembled into a parallel data format. At each CLOCK cycle a valid scaled pixel is created by the logic operator and subsample circuit 22, which pixel is shifted into the serial to parallel shift register 23. From this point, the data can be passed to the general purpose port 1 and read out by the system microprocessor 5 or the DMA controller 6.

Figure 5:
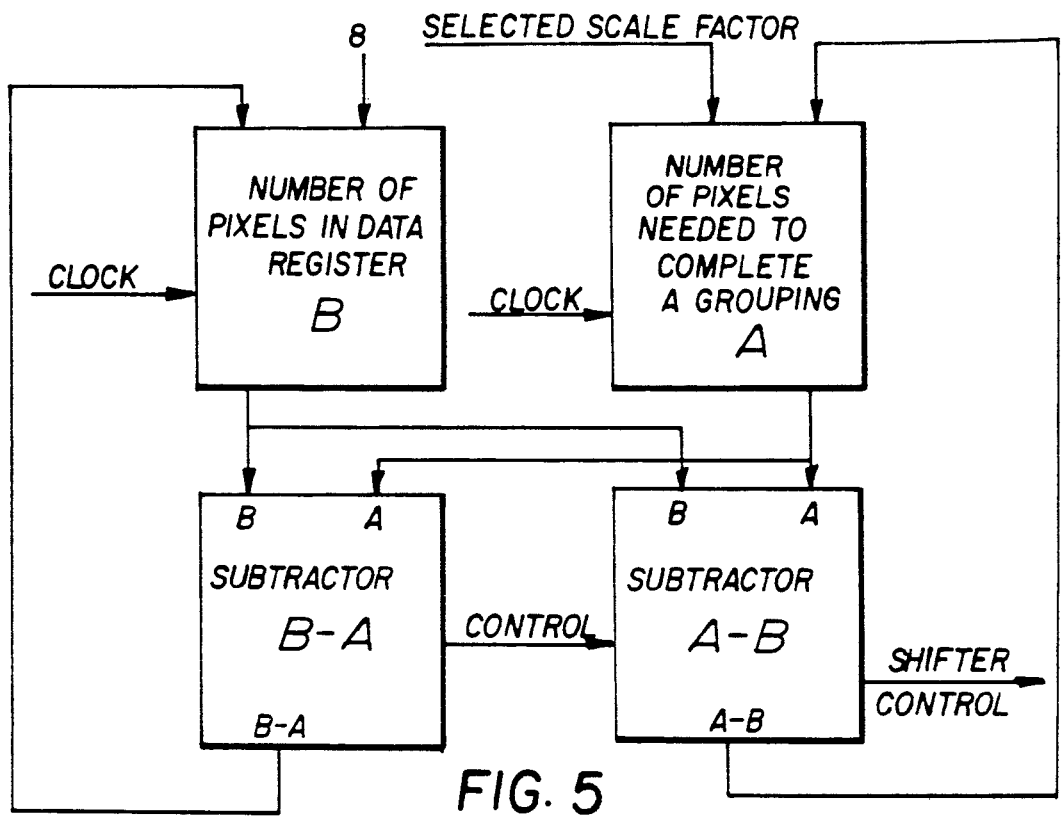
FIG. 5 is a sub level block diagram illustrating the comparator circuit.

Once the scale factor selection is made, it is passed to the comparator circuit 12 illustrated in FIG. 5. The comparator circuit 12 uses the scale factor selection, as well as the state information of the pixel processor and data shifter circuit 11 to output a shift control value to the data shifter 20. The comparator circuit 12 consists of two registers and two subtractive comparators. Register A contains the number of pixels needed to complete a scale grouping. A scale grouping has a slightly different meaning depending on which method of scaling is being performed. For subsampling, it represents the number of pixels we are throwing away plus the one pixel we are keeping in the scaled group of pixels. For logical reduction, it represents the group of pixels we are throwing away plus the one pixel we are keeping in the scaled group of pixels. For logical reduction, it represents the group of pixels we are applying to the logic operator. For pixel replication, it represents how many more times the current input pixel must be replicated. Register B contains the number of pixels in the input pixel data register 21 that have not yet been used in the scaling process, regardless of which method of scaling is being performed. When register A is loaded with the selected scale factor, it indicates the total number of pixels to be subsampled or applied to the logic operator for subsampling or logical reduction, respectively. For scaling up, the loaded selected scale factor indicates the total number of times a pixel is to be replicated. When scaling begins, register A is loaded with the first selected scale factor. Register B is loaded with the value 8. This is because the input pixel data register 21 is 8-bits wide, thus 8 represents the total number of pixels currently available for scaling. As scaling is allowed to proceed, register A and register B are compared by two subtractive comparators A-B, and B-A. Subtractor A-B evaluates the quantity from register A minus the quantity from register B. Subtractor B-A evaluates the quantity from register B minus the quantity from register A. Only one of the two subtractors can produce a positive non-zero result. If subtractor A-B yields the positive non-zero result, register A's output is greater than register B's output. This means that the number of pixels needed to complete the scale grouping is larger than the number of pixels in the input pixel data register 21. When this occurs, all the pixels in the input pixel data register 21 are scaled and the register will be loaded with a new 8-bits of raw input image data on the ensuing CLOCK cycle. The output of subtractor A-B is fed back to register A to indicate how many more pixels are still required to complete the scale grouping. Register B is loaded with the value 8 on the ensuing CLOCK cycle, indicating that there is new pixel data in the input pixel data register 21. A shifter control value is generated by subtractor A-B, indicating to data shifter B-A how many pixels to shift into the logic operator and subsample circuit 22. Since more data is needed to complete the grouping, logic operator and subsample circuit 22's output is not shifted into the serial to parallel shift register 23.

If the subtractor B-A yields a positive non-zero result, then register B's output is greater than that from register A. In this case, the number of pixels in the input data register 21 is greater than the number of pixels needed to complete the scale grouping. This means there are enough pixels in the input pixel data register 21 to complete the scale grouping. When this situation occurs, the contents of register A becomes the shifter control value for the data shifter 20. Register A is loaded on the ensuing CLOCK cycle with the next selected scale factor to indicate the total number of pixels required for the next scale grouping. Register B is loaded on the ensuing CLOCK cycle with subtractor B-A's output, indicating the number of pixels in the input pixel data register 21 which have not yet been used in the scaling process.

If the outputs of register A and register B are equal, both subtractor A-B and subtractor B-A will yield a 0 result. When this occurs, the number of pixels needed to complete a grouping is equal to the number of pixels remaining in the input data register 21. Therefore the register A value is used as the value of the shifter control signal. Register A will be loaded on the ensuing value of the shifter control signal. Register A will be loaded on the ensuing CLOCK cycle with the next selected scale factor. The input pixel data register 21 will have used up all pixels for scaling, and hence is loaded with a new 8-bits of input pixel data on the ensuing CLOCK cycle. Register B will be loaded on the ensuing CLOCK cycle with the value 8, reflecting the new data in the input pixel data register 21.

The operation of the comparator circuit 12 as described above only applies to scaling down by subsampling and logical reduction. Operation for scaling up with pixel replication is slightly different. A scale grouping for scaling up refers to the number of times a pixel is replicated. Pixels can only be replicated at the rate of one pixel per CLOCK cycle. In this sense, the selected scale factor represents a count value that can be decremented each CLOCK cycle and a pixel is replicated. Therefore, during the scale up operation, register A operates as a decrementing counter on each cycle that a pixel is replicated. The shifter control signal indicates no shifting is to be performed until register A reaches a count of 0, indicating that the replication of the input pixel is complete. At that time the shifter control value will be a 1, indicating that it is time to replicate the next input pixel. Register B will also operate as a decrementing counter during scale up. Each time register A is fully decremented, register B will decrement by 1, indicating that another pixel in the input pixel data register 21 has been used up. When register B is fully decremented, all 8 bits in the input data register have been used up in scaling (replicating). The next 8-bits of raw pixel data will be loaded into the input pixel data register 21 on the next CLOCK cycle. Register B will be loaded with the value 8, reflecting this condition.

Certain enhancements exist in the disclosed apparatus for accommodating two dimensional image scaling for all three of the scaling algorithms. For logical reduction, the definition of a pixel grouping can be expanded to encompass a horizontal and a vertical matrix of pixels to apply to the logic operator portion of the logic operator and subsample circuit 22. This is somewhat difficult to accomplish due to the raster scan ordering of the input pixel data stream. The present invention provides a mechanism whereby the scaled output pixels from the serial to parallel shift register 23 can be stored in the static RAM 9. Each stored pixel represents a partially scaled subgrouping in the horizontal direction. As subsequent line scans are processed in the horizontal direction, partially scaled subgroupings are read back from the static RAM 9 and applied to the logic operator along with the current horizontal partially scaled subgrouping. The new partially scaled subgroupings that occur from this process are written back to the static RAM 9, overwriting the previous horizontal partially scaled subgroupings. The process will continue to occur until the last horizontal line scan of the entire horizontal and vertical matrix of pixels enters the input pixel data stream. During this last line scan the scaled output pixels from the serial to parallel shift register 23 will represent the resultant (scaled) pixel for the entire horizontal and vertial matrix of pixels.

For two dimensional subsampling, it is not necessary to apply the input data stream to the data shifter 20 until the last line scan of the two dimensional sequence. The input data stream can simply be read in and discarded during this time interval. This can enhance system performance because the input data stream from the external world will not be held up waiting for the shifting operations.

For two dimensional scale up, it is necessary to replicate entire line scans vertically as well as replicating pixels horizontally. Therefore, it is highly desirable to store the input data stream of pixels from the outside world on a line scan, by line scan basis. The present apparatus provides a mechanism for storing away the input data stream into the static RAM 9 each time the input pixel data register 21 is loaded from the input data stream during the first line of a two dimension sequence. The present apparatus also provides a mechanism for retrieving the input data stream from the static RAM and for loading it into the input pixel data register 21 such that multiple line scans can be duplicated from the original line scan.

Figure 6:
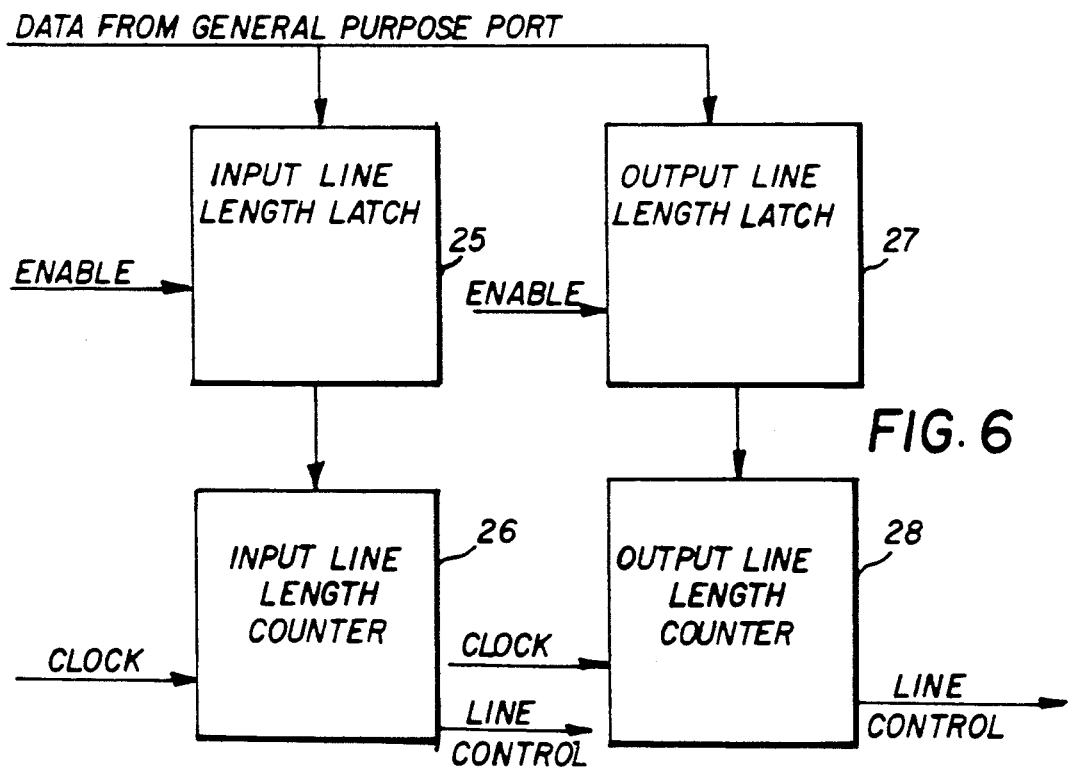
FIG. 6 is a sub level block diagram illustrating the input and output line length logic.

There are no demarcations in the input data stream to determine how much data an input line scan consists of. Similarly, there are no demarcations to denote how much data in the output data stream comprises an output line scan. The apparatus necessary to determine line scan boundaries is shown in FIG. 6. An input line length latch 25 and an output line length latch 27 are loaded under software control. Both latches are loaded before any scaling begins. The value loaded into the input line length latch 25 determines the number of data transfers from the input data stream that comprise an input line scan. Similarly the output line length latch 27 determines the number of data transfers from the output data stream that comprise an output line scan. The input line length latch 25 is used to load the input line length counter 26. The input line length counter 26 is loaded with the value in the input line length latch 25, received from the input data stream, and the input line length counter 26 is decremented by 1. When the input line length counter 26 is fully decremented, the end of an input line scan will have been reached in the input data stream. The input line length counter 26 will then reload itself with the value in the input line length latch 25, such that subsequent input line scans can be determined. The operation of the output line length counter 28 is similar. The output line length counter 28 is loaded with the value in the output line length latch 27 before scaling begins. As each output data transfer is read from the output data stream, the output line length counter 28 is decremented by 1. When the output line length counter 28 is fully decremented, the end of an output line scan will have been reached. The output line length counter 28 will reload itself with the value in the output line length latch 27, such that subsequent output line scans can be determined. The fact that the counters are loaded from pre-loaded latches instead of under software control allows for scaling to occur from line scan to line scan with no software intervention (except for servicing input and output data streams ) Input and output line lengths can also be programmed with mismatched values to perform windowing operations.

Appendix A illustrates an example of subsampling for achieving a 3:1 scaling for the three conditions of horizontal, vertical, and vertical and horizontal subsampling.

Appendix B illustrates an example of logical reduction for achieving a 3:1 scaling for the three conditions of horizontal, vertical, and vertical and horizontal pixel ORing.

Appendix C illustrates an example of pixel replication for achieving a 1:3 scaling for the three conditions of horizontal, vertical, and vertical and horizontal pixel replication.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

APPENDIX A

SUBSAMPLE EXAMPLE:
foreground pixel
* background pixel

This example shows the effects of 3:1 scaling.

Horizontal subsampling:

```
Original line.   * * * * * * * * * * * * # * * * * # * * * * # * * * * * * * * * * *
Groupings        ^   ^   ^   ^   ^   ^   ^   ^   ^   ^   ^
Output line      *   *   *   *   *   #   *   *   *   *   *
```

Vertical subsampling:

```
Original line.   * * * * * * * * * * * * # * * * * # * * * * # * * * * * * * * * * *
Original line.   * * * * # * * * * * * * * # * * * * # * * * * # * * * * * * # # * * * *
Original line. > * * * * * * * * # # # * * # * * * * # * * * * # * * * * * * * * * * *
Original line.   * * * * # * * * * * * * * # * * # # * * * * # * * * * * # # * * *
Original line.   * * * * # * * * * * * * * # * * * * # * * * * * * * * * * * * # # * * *
Original line. > * * * * # * * * * * * * * * * * * * # * * * * * * * * * * * # * * * *

Output line.     * * * * * * * # # # * * # * * * * # * * * * # * * * * * * * * * * *
Output line.     * * * * # * * * * * * * * * * * * # * * * * * * * * * * * # * * * *
```

Vertical and horizontal subsampling:

```
Original line.   * * * * * * * * * * * * # * * * * # * * * * # * * * * * * * * * * *
Original line.   * * * * # * * * * * * * * # * * * * # * * * * # * * * * * # # * * * *
Original line. > * * * * * * * * # # # * * # * * * * * # * * * * # * * * * * * * * * * *
Original line.   * * * * # * * * * * * * * # * * # # * * * * # * * * * * # # * * * *
Original line.   * * * * # * * * * * * * * # * * * * # * * * * * * * * * * # # * * *
Original line. > * * * * # * * * * * * * * * * * * * # * * * * * * * * * * * # * * * *
Grouping.
                 ^   ^   ^   ^   ^   ^   ^   ^   ^   ^   ^
Output line.     *   *   #   *   *   *   #   *   *   *   *
Output line.     *   *   *   *   *   #   *   *   *   #   *
```

APPENDIX B

LOGICAL REDUCTION:
foreground pixel
* background pixel

This example shows the effects of 3:1 scaling.

Horizontal pixel ORing:

```
Original line.   * * * * * * * * * * * * # * * * * # * * * * # * * * * * * * * * * *
Groupings        ^   ^   ^   ^   ^   ^   ^   ^   ^   ^   ^
Output line      *   *   *   *   *   #   *   *   *   *   *
```

Vertical pixel ORing:

APPENDIX B-continued

```
Original line.       ************#****#****#***********
Original line.       ****#*******#****#****#*****##****
Original line.    >*******###**#****#****#***********
Original line.       ****#********#**##****#*****##****
Original line.       ****#********#****#**********##****
Original line.    >#****#************#***********#****

Output line.         ****#****###*#****#****#*****##****
Output line.         #****#*******#**###****#*****##****
```

Vertical and horizontal pixel ORing:

```
Original line.       ************#****#****#***********
Original line.       ****#*******#****#****#*****##****
Original line.    >*******###**#****#****#***********
Original line.       ****#********#**##****#*****##****
Original line.       ****#********#****#**********##****
Original line.    >****#************#***********#****
Grouping.
                     ^   ^  ^  ^  ^  ^  ^  ^  ^  ^  ^
Output line.         *   #  #  #  #  #  *  #  *  #  *
Output line.         *   #  *  *  *  #  *  *  *  #  *
```

APPENDIX C

PIXEL REPLICATION EXAMPLE:
foreground pixel
* background pixel

This example shows the effects of 1:3 scaling.

Horizontal pixel replication:

```
Original line.    ***##**#
Output line       *********######*****###
```

Vertical pixel replication:

```
Original line.    ***##**#
Output line.      ***##**#
Output line.      ***##**#
Output line.      ***##**#
```

Vertical and horizontal pixel replication:

```
Original line.    ***##**#
Output line.      *********######*****###
Output line.      *********######*****###
Output line.      *********######*****###
```

We claim:

1. A method for scaling a bitonal image produced from a digital input data stream using pixel replication comprises the steps of:
    a. generating a scale factor selection sequence;
    b. selecting a sequence of scale factors based upon said scale factor selection sequence, whereby each selected scale factor represents the number of times a pixel is to be replicated;
    c. decrementing a current scale factor from said sequence of scale factors by 1;
    d. performing a pixel replication of a current bit of the input data stream each time said current scale factor is decremented;
    e. obtaining a next current scale factor from said scale factor sequence once said current scale factor is fully decremented;
    f. obtaining a next current bit from said input data stream once said current scale factor is fully decremented;
    g. shifting said input data stream by one when scale factor is fully decremented; and
    h. reformatting the replicated pixels with a serial to parallel conversion.

2. The method of selecting horizontal scale factors, comprising the steps of:
    a. generating a scale factor selection sequence, by
        a.1. determining scale factor integers; and
        a.2. calculating said scale factor selection sequence of said scale factor integers, before scaling begins;
    b. storing said scale factor selection sequence, before scaling begins;
    c. loading said scale factor integers, each one integer count apart, before scaling begins;
    d. retrieving said scale factor selection sequence while horizontal scaling is in progress; and
    e. selecting said scale factor integers based upon retrieved said scale factor selection sequence.

* * * * *